(12) United States Patent
Kudo et al.

(10) Patent No.: US 9,760,403 B2
(45) Date of Patent: Sep. 12, 2017

(54) INFORMATION PROCESSING SYSTEM AND METHOD FOR DISTRIBUTING LOAD OVER HARDWARE PROCESSING AND SOFTWARE PROCESSING

(71) Applicant: Hitachi, Ltd., Chiyoda-ku, Tokyo (JP)

(72) Inventors: Yasuyuki Kudo, Tokyo (JP); Junichi Miyakoshi, Tokyo (JP); Masato Hayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 25 days.

(21) Appl. No.: 14/890,040

(22) PCT Filed: Jul. 11, 2013

(86) PCT No.: PCT/JP2013/069063
§ 371 (c)(1),
(2) Date: Nov. 9, 2015

(87) PCT Pub. No.: WO2015/004788
PCT Pub. Date: Jan. 15, 2015

(65) Prior Publication Data
US 2016/0077877 A1 Mar. 17, 2016

(51) Int. Cl.
*G06F 9/50* (2006.01)
*G06F 17/30* (2006.01)

(52) U.S. Cl.
CPC .............. *G06F 9/50* (2013.01); *G06F 9/5083* (2013.01); *G06F 9/5066* (2013.01); *G06F 17/30958* (2013.01); *G06F 2209/5017* (2013.01)

(58) Field of Classification Search
None
See application file for complete search history.

(56) References Cited

U.S. PATENT DOCUMENTS 6,230,303 B1 * 5/2001 Dave ..................... G06F 9/4881
716/105
8,386,286 B2 * 2/2013 Srinivas ................. G06Q 10/06
705/7.11

(Continued)

FOREIGN PATENT DOCUMENTS

| JP | 2005-332162 A | 12/2005 |
| JP | 2006-330893 A | 12/2006 |
| JP | 2013-125419 A | 6/2013 |

OTHER PUBLICATIONS

PCT International Search Report on application PCT/JP2013/069063 mailed Sep. 3, 2013; 4 pages.

(Continued)

*Primary Examiner* — Abu Ghaffari
(74) *Attorney, Agent, or Firm* — Foley & Lardner LLP

(57) ABSTRACT

An information processing system includes a optimal-load arrangement means containing a load analysis means, a load distribution means, and program information. The load-computation execution means contains a hardware processing means and a software computation means. The program information includes resource information and information pertaining to data to be processed and the content of the processing to be performed thereon. The load analysis means has the ability to perform community assignment in which, of the data to be processed, data in regions having heavy loads and communication volumes that can be reduced is assigned to a hardware community and data in other regions is assigned to a software community. The load distribution means divides up the data to be processed such that the data assigned to the hardware community is processed by the hardware processing means and the data assigned to the software community is processed by the software computation means.

12 Claims, 11 Drawing Sheets

(56) References Cited

U.S. PATENT DOCUMENTS

| | | | | |
|---|---|---|---|---|
| 9,158,719 | B2* | 10/2015 | Lopez Bueno | G06F 13/36 |
| 9,208,257 | B2* | 12/2015 | Milenova | G06F 17/30705 |
| 9,215,158 | B1* | 12/2015 | Adogla | H04L 29/08144 |
| 2004/0098701 | A1* | 5/2004 | Klein | G06F 17/5045 |
| | | | | 716/103 |
| 2004/0243384 | A1* | 12/2004 | Chen | G06F 17/5027 |
| | | | | 703/23 |
| 2006/0080422 | A1* | 4/2006 | Huberman | G06Q 10/10 |
| | | | | 709/223 |
| 2009/0271206 | A1* | 10/2009 | Bhogal | G06F 9/5083 |
| | | | | 705/1.1 |
| 2012/0005238 | A1* | 1/2012 | Jebara | G06Q 10/04 |
| | | | | 707/798 |
| 2012/0282888 | A1* | 11/2012 | Frias Martinez | G06T 17/20 |
| | | | | 455/405 |
| 2013/0019008 | A1* | 1/2013 | Jorgenson | H04L 41/12 |
| | | | | 709/224 |
| 2013/0024479 | A1* | 1/2013 | Gong | G06F 9/5066 |
| | | | | 707/798 |
| 2013/0339290 | A1* | 12/2013 | Lee | G06F 17/10 |
| | | | | 706/55 |
| 2013/0339352 | A1* | 12/2013 | Jin | G06F 17/30958 |
| | | | | 707/736 |

OTHER PUBLICATIONS

Babb, Jonathan W., et al.; Solving graph problems with dynamic computation structures; High-Speed Computing, Digital Signal Processing, and Filtering Using Reconfigurable Logic, vol. 2914, No. 1. (1996); pp. 225-236.

* cited by examiner

F I G. 3
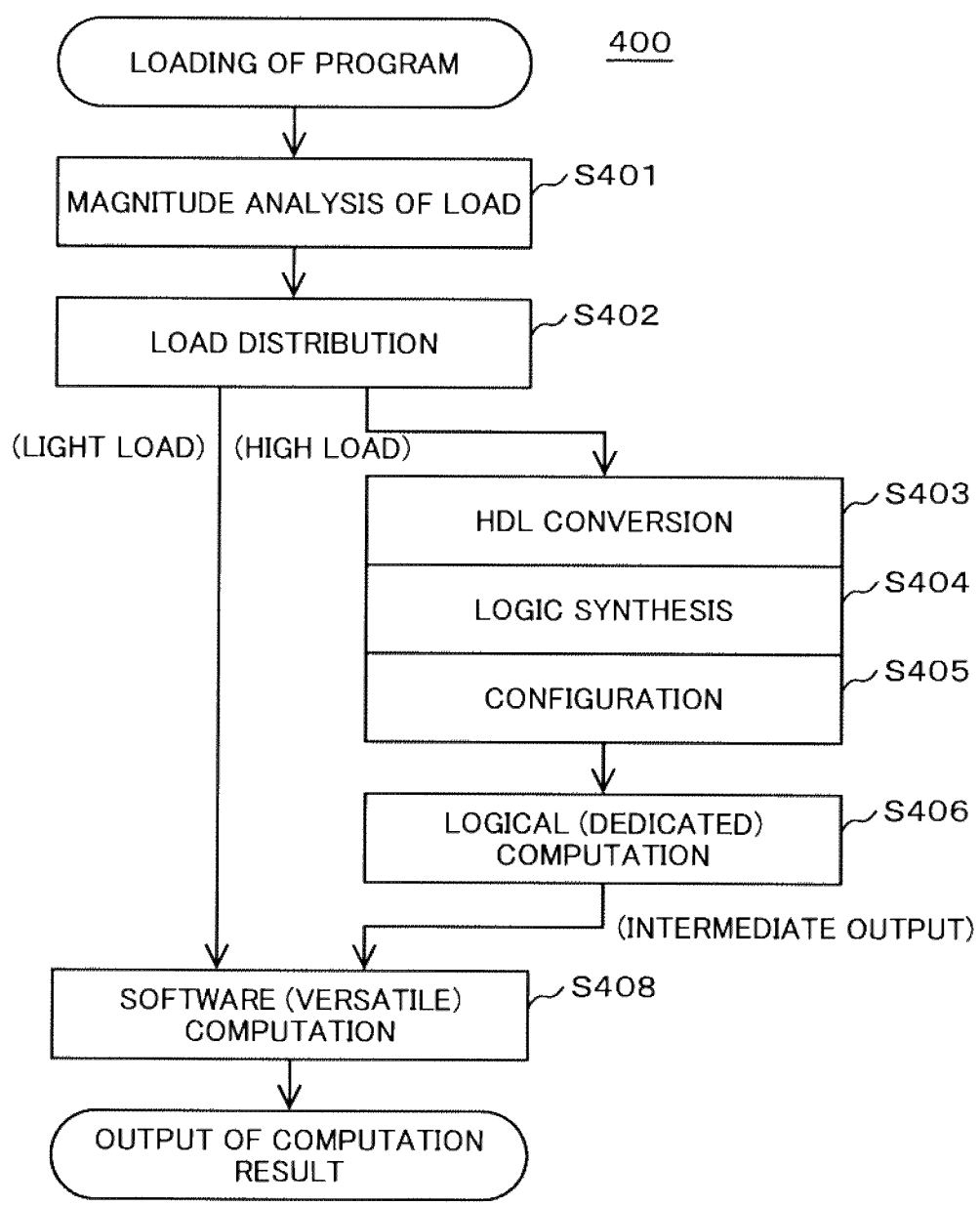

| | | DESTINATION APEX ID | | | | | | | | | | | OUTPUT ORDER |
|---|---|---|---|---|---|---|---|---|---|---|---|---|---|
| | | 1 | 2 | 3 | 4 | 5 | 6 | 7 | 8 | 9 | ...... | 61 | 62 | |
| SOURCE APEX ID | 1 | | – | – | 1 | – | 1 | – | 1 | – | ...... | – | 1 | 5 |
| | 2 | – | | – | – | – | 1 | – | 1 | – | ...... | – | – | 2 |
| | 3 | – | 1 | | – | – | – | – | – | – | ...... | 1 | – | 2 |
| | 4 | 1 | – | – | | – | – | 1 | – | – | ...... | – | 1 | 4 |
| | 5 | – | – | 1 | – | | – | – | – | – | ...... | – | – | 1 |
| | 6 | – | – | – | – | – | | – | – | 1 | ...... | – | – | 1 |
| | 7 | – | – | – | 1 | – | – | | – | – | ...... | – | 1 | 2 |
| | 8 | 1 | – | 1 | 1 | – | – | – | | – | ...... | 1 | 1 | 8 |
| | 9 | – | – | – | – | 1 | – | – | – | | ...... | – | – | 2 |
| | ⋮ | ⋮ | ⋮ | ⋮ | ⋮ | ⋮ | ⋮ | ⋮ | ⋮ | ⋮ | ...... | ⋮ | | |
| | 61 | – | – | – | 1 | – | – | 1 | 1 | ...... | | – | 3 |
| | 62 | – | – | – | – | – | 1 | – | – | ...... | | | 1 |
| INPUT ORDER | | 2 | 3 | 4 | 3 | 1 | 5 | 2 | 4 | 2 | ...... | 3 | 6 | |

F I G. 6
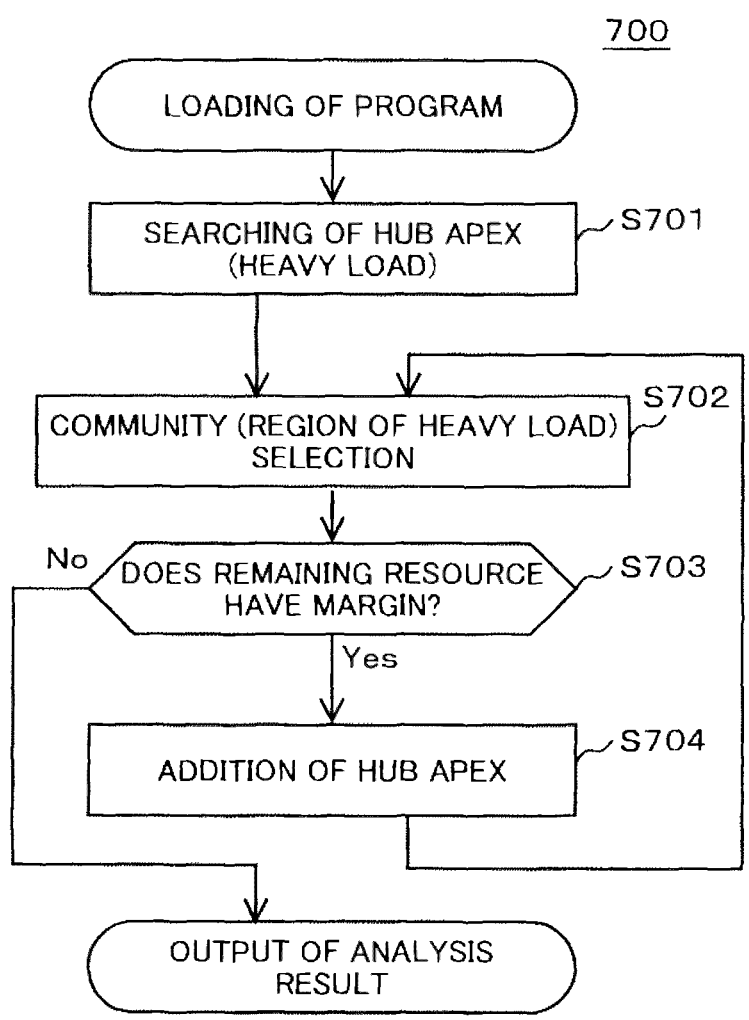

FIG. 7
| # | RANGE FROM HUB APEX | MAXIMUM ORDER OF NON-HUB APEX | TOTAL NUMBER OF APEXES① | NUMBER OF BOUNDARY SIDES② | TOTAL NUMBER OF SIDES③ | COMMUNITY RATIO (①/②) |
|---|---|---|---|---|---|---|
| 1 | 2 passes | 3 | 18 | 6 | 20 | 3.00 |
| ② | 3 passes | | 21 | 5 | 23 | 4.20 |
| 3 | 4 passes | | 23 | 7 | 25 | 3.29 |
| 4 | 2 passes | 4 | 21 | 7 | 24 | 3.00 |
| 5 | 3 passes | | 26 | 7 | 30 | 3.71 |
| ⑥ | 4 passes | | 31 | 11 | 36 | 2.82 |
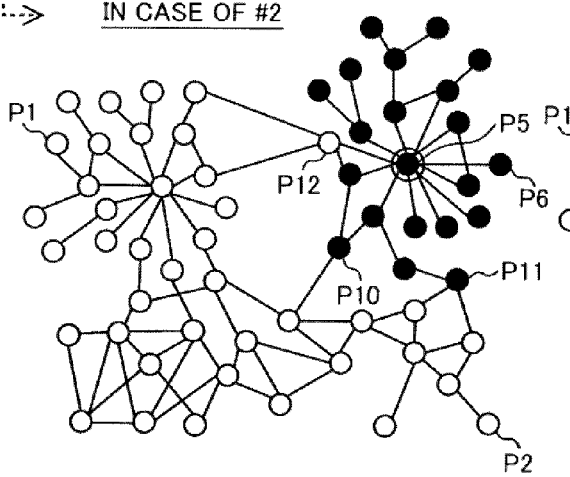
IN CASE OF #2
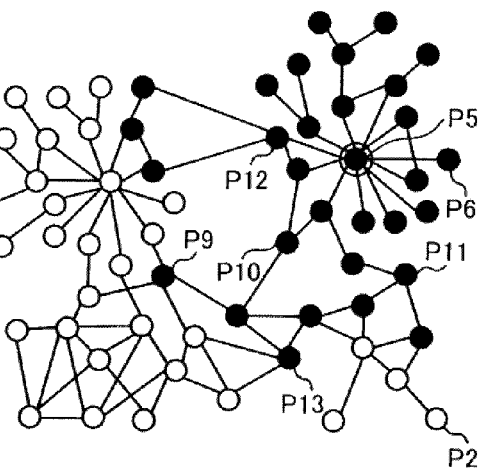
IN CASE OF #6
○ : SOFTWARE COMMUNITY
● : HARDWARE COMMUNITY
◉ : HUB APEX

| # | RANGE FROM HUB APEX | MAXIMUM ORDER OF NON-HUB APEX | TOTAL NUMBER OF APEXES① | NUMBER OF BOUNDARY SIDES② | TOTAL NUMBER OF SIDES③ | COMMUNITY RATIO (①/②) |
|---|---|---|---|---|---|---|
| ⑦ | 2 passes | 3 | 41 | 11 | 43 | 4.00 |
| 8 | 3 passes |   | 41 | 11 | 43 | 4.00 |
| 9 | 4 passes |   | 41 | 11 | 43 | 4.00 |
| ⑩ | 2 passes | 4 | 43 | 7 | 494 | 6.14 |
| 11 | 3 passes |   | 45 | 9 | 52 | 5.00 |
| 12 | 4 passes |   | 48 | 8 | 58 | 6.00 |

○ : SOFTWARE COMMUNITY
● : HARDWARE COMMUNITY
◉ : HUB APEX

F I G. 9
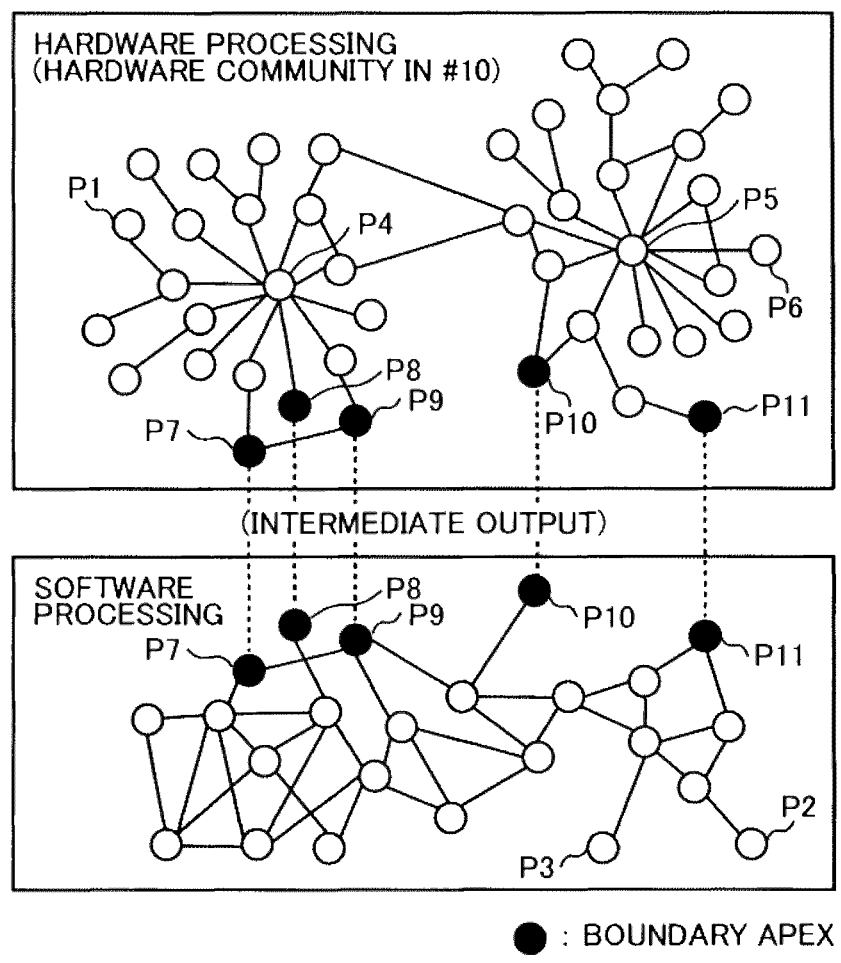

F I G. 1 0
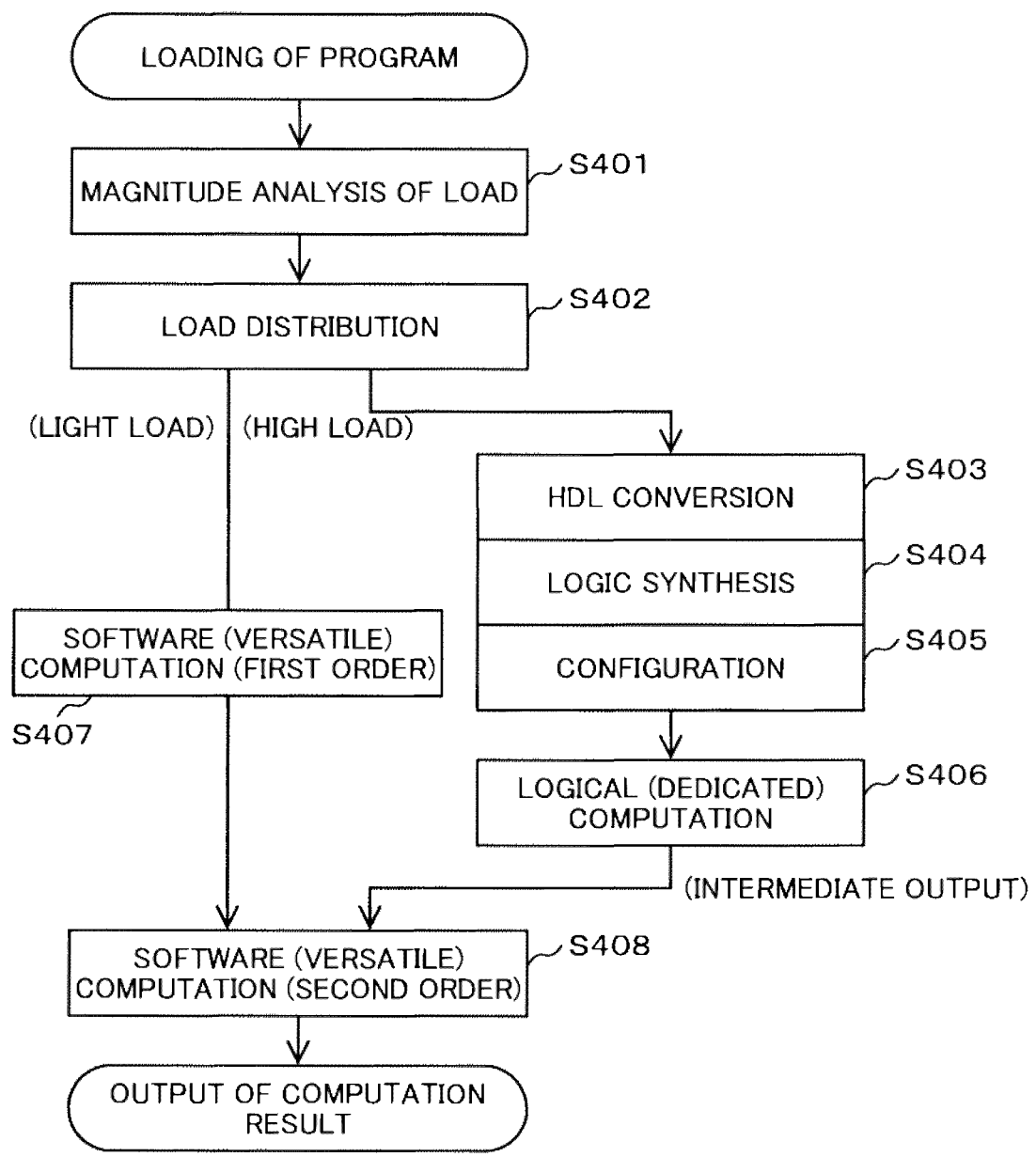

INFORMATION PROCESSING SYSTEM AND METHOD FOR DISTRIBUTING LOAD OVER HARDWARE PROCESSING AND SOFTWARE PROCESSING

TECHNICAL FIELD

The present invention relates to an information processing system and an information processing method, and more particularly, to a system using an FPGA (field-programmable gate array) to increase information processing speed and a processing method therefor.

BACKGROUND ART

As a background art of this technical field, a graph processing method is described in Non-patent Literature 1. This Non-patent Literature 1 describes a method of converting a graph problem such as shortest path searching into a logical circuit, mounting the logical circuit on an FPGA, and performs processing. According to this method, in comparison with arithmetic processing using a CPU, processing for solving the graph problem (to be referred to graph manipulation hereinafter) can be performed at a high speed. On the other hand, according to the Non-Patent Literature 1 described above, a method in which, when a graph scale is too large to achieve a logical circuit to be mounted on an FPGA constituted by one chip, the logical circuit is divided into a plurality of FPGAs to perform the graph manipulation is described.

CITATION LIST

Non-Patent Literature

NPTL 1: J. Babb, M. Frank, and A. Agarwal, "Solving Graph Problems with Dynamic Computational Structures," in Proceedings of SPIE: High-Speed Computing, Digital Signal Processing, and Filtering Using reconfigurable Logic, vol. 2914, November 1996, pp. 225-236.

SUMMARY OF THE INVENTION

Technical Problems

In recent years, a large-scale graph constituted by, for example, tens of millions of apexes is strongly demanded to be processed to analyze or predict complex economic systems and movements of societies. For the purpose, the number of apexes which can be mounted on a recent FPGA is presumed to be thousands or several tens of thousands per chip. For this reason, when graph manipulation is performed by using the method described in the Non-patent Literature 1, it is estimated that at least several thousand chips of FPGAs are required. Thus, even though the graph manipulation can be performed at a high speed, the cost considerably increases, and a practical information system cannot be constructed.

The present invention has been made in consideration of the above problem and has as its object to provide an information processing system that can process a large-scale graph at a high speed and a low cost.

Solution to the Problems

As an example of the present invention, there is provided an information processing system including an optimal-load arrangement means and a load-computation execution means, wherein the optimal-load arrangement means has a load analysis means, a load distribution means, and program information, the load-computation execution means has a hardware processing means and a software computation means, and the program information includes data to be processed, information pertaining to processing contents, and information pertaining to resources, the load analysis means has a community selecting function of assigning, in the data to be processed, data in regions having heavy loads and reducible communication volumes to a hardware community and assigning data in the other regions to a software community, and the load distribution means distributes the data to be processed such that the assigned data of the hardware community is processed by the hardware processing means and the assigned data of the software community is processed by the software computation means.

Advantageous Effects of the Invention

According to the information processing system of the present invention, within a range in which information can be processed by resources of an FPGA, regions having heavy processing loads are selected and processed by the FPGA, and regions having light processing loads are processed by software to make it possible to compatibly achieve high-speed processing and a low cost, especially in large-scale processing.

BRIEF DESCRIPTION OF DRAWINGS

FIG. 3 is a flow chart for explaining an operation of the information processing system according to the first embodiment.

FIG. 6 is a flow chart for explaining an operation of a load analysis means in the first embodiment.

FIG. 7 is a diagram for explaining an operation of the load analysis means in the first embodiment.

FIG. 9 is a diagram for explaining an image of processing of a load distribution means in the first embodiment.

FIG. 10 is a flow chart for explaining an operation of an information processing system according to a second embodiment of the present invention.

MODE FOR CARRYING OUT THE INVENTION

Embodiments of the present invention will be described below with reference to the accompanying drawings.
First Embodiment An example of an information processing system according to a first embodiment of the present invention will be described below with reference to FIG. 1 to FIG. 9.

Figure 1:
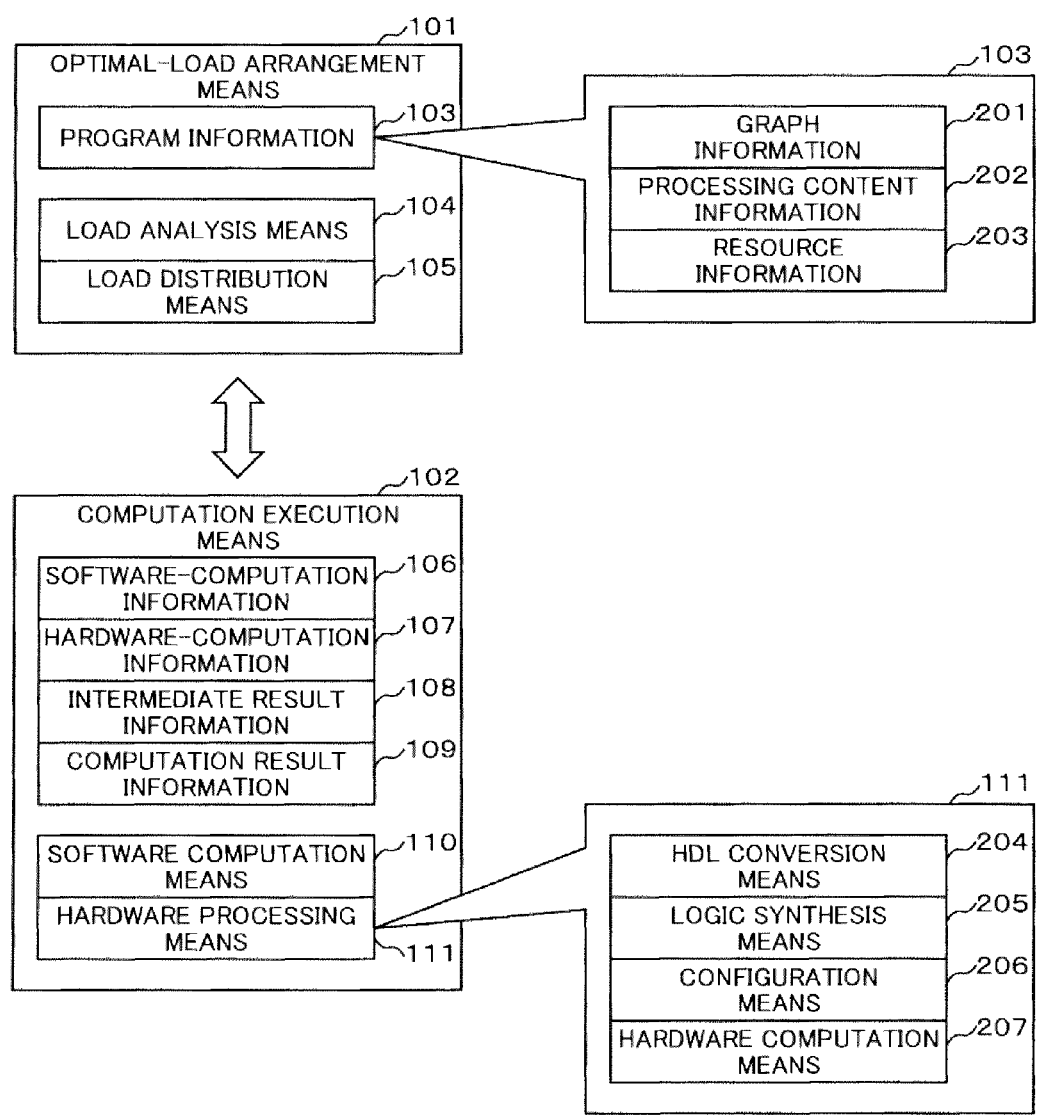
FIG. 1 is a block diagram for explaining a function of an information processing system using an FPGA according to a first embodiment of the present invention.

FIG. 1 is a functional block diagram of an information processing system according to the first embodiment of the present invention. In FIG. 1, reference numeral 101 denotes an optimal-load arrangement means, and 102 denotes a load-computation execution means. The optimal-load arrangement means 101 includes program information 103, a load analysis means 104, and a load distribution means 105, and determines a range processed by an FPGA serving as a hardware computation means depending on a load to be processed, for example, a load of graph manipulation. The load-computation execution means 102 includes software-computation information 106, hardware-computation information 107, intermediate result information 1108, computation-result information 109, a software computation means 110, and a hardware processing means 111. The program information 103 includes information 201 of data to be processed, for example, information of a graph constituted by apexes and side and including connection relationships between the apexes, processing content information 202, for example, information pertaining to processing for shortest path searching, and resource information 203, for example, information (the number of apexes, the number of sides, and the like) having a circuit scale which can be mounted on an FPGA. The hardware processing device 111 includes an HDL conversion means 204, a logic synthesis means 205, a configuration means 206, and a hardware computation means 207. The configuration means 206 and the hardware computation means 207 are achieved by an FPGA device.

Figure 2:
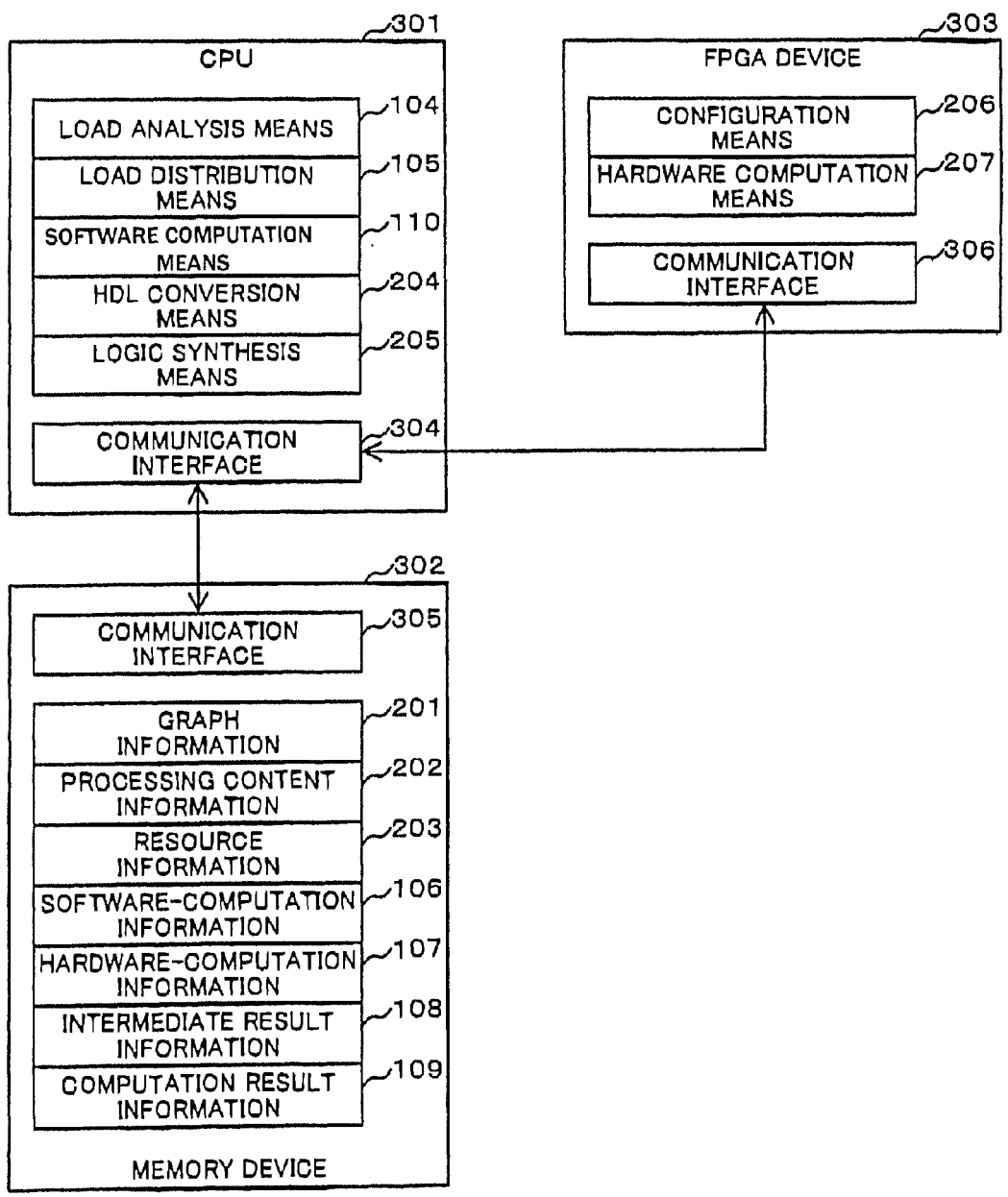
FIG. 2 is a block diagram for explaining a hardware image of the information processing system in FIG. 1.

FIG. 2 is obtained by grouping functional blocks 104 to 110 and 201 to 207 of the information processing system in FIG. 1 by a hardware image. Reference numeral 301 denotes a CPU; 302 denotes a memory device, and 303 denotes an FPGA device. Reference numerals 304 to 306 denote communication interfaces, respectively. It is assumed that all information exchanges between the pieces of hardware are performed through the communication interfaces.

An operation of the information processing system according to the present invention will be described.

FIG. 3 is a flow chart showing an operation 400 of the information processing system. In FIG. 3, step S401 denotes processing of load analysis, step S402 denotes processing of load distribution, step S403 denotes processing of HDL conversion, step S404 denotes processing of logic synthesis, step S405 denotes processing of configuration, step S406 denotes processing of a logical computation processed by dedicated hardware, and step S408 denotes processing of software computation.

Figures 4, 5:
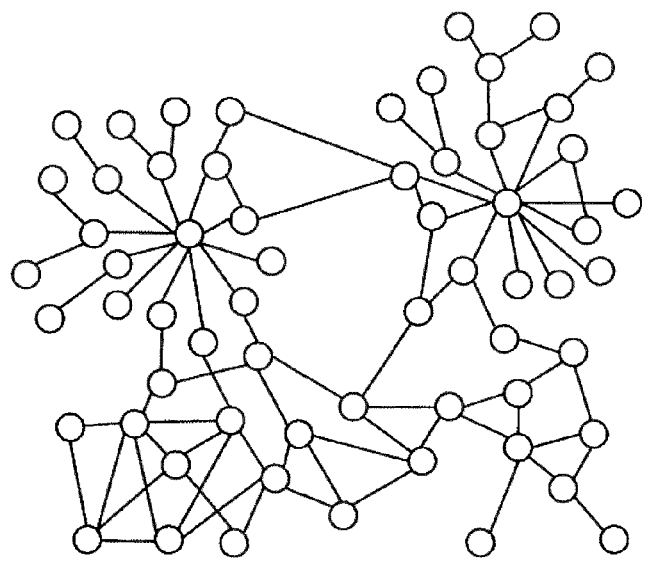
FIG. 4 is a diagram for explaining an image of graph information to be processed.
FIG. 5 is a diagram for explaining concrete contents of the graph information in FIG. 4.

First, program information 103 stored in the memory means 302 is loaded on the information processing system to start processing. The program information 103 includes graph information 201, processing content information 202, and resource information 203. The graph information 201 is information showing the characteristics of a graph to be processed. FIG. 4 is a diagram showing an image of the graph information 201 to be processed, and FIG. 5 is a diagram for explaining concrete contents of the graph information 201. In the first embodiment, the graph 201 including 65 apexes and 90 sides is used as a target, and connection relationships between the apexes are given by the contents shown in FIG. 5. Unique IDs (ID1 to ID62) are given to the apexes, respectively. In FIG. 5, a portion described as "1" means that apexes are connected to each other at a distance of 1. A sum of the input order and the output order of each of the apexes in FIG. 5 is the order of the corresponding apex, and corresponds to a load. The processing content information 202 is information representing the contents of graph manipulation, and in the first embodiment, is for shortest path searching between all the apexes and all the apexes. The resource information 203 is information representing the scale of a circuit which can be mounted on an FPGA. In the first embodiment, an acceptable value of the number of apexes is defined as 50, and an acceptable value of the number of sides is defined as 100.

The load analyzing processing S401 is executed by the load analysis means 104, a range of graph manipulation to be executed by the hardware computation means 207 and the software computation means 110 depending on loaded program information, and outputs the determination result as an analysis result.

Details of an operation of load analyzing processing 700 will be described below with reference to FIG. 6.

In FIG. 6, processing S701 is for hub apex searching, processing S702 is for community analyzing, processing S703 is for determining whether resources have margins, and processing S704 is for hub apex addition. In the hub apex searching processing S701, a distance list between the apexes (ID1 to ID62) shown in FIG. 5 is loaded, and an order list in which the IDs of the apexes are rearranged in descending order of orders is generated. In this case, the order means the number of sides input/output to from the apex, and can be calculated by adding up an input order and an output order in FIG. 5 for each of the apex IDs. For example, the order of the apex of the ID1 is given by 2+5=7. In the order list, when there is an apex having an order larger than 100 which is the acceptable value of the number of sides, the apex is excluded from the list, and another apex having the maximum order equal to or smaller than 100 is used as a hub apex. In the community selection processing S702, several candidates 800 of apex groups (to be referred to as communities hereinafter) formed around hub apexes are supposed, and an apex having the highest community ratio is assigned therefrom. The hardware community candidate 800 can be generated by using, parameters, for example, the number of sides (to be referred to as the number of paths hereinafter) representing the number of sides connected to the hub apex and the maximum order of a non-hub apex.

For example, as shown in FIG. 7, when a range of the paths (passes) from the hub apex is given by 2 to 4, and the maximum order of the non-hub apex is given by 3 or 4. In this case, the hardware community candidates 800 of six types can be generated. For each of the hardware candidates 800, the total number of apexes 801, the number of boundary sides 802, and the total number of sides 803 are calculated. In case #2, when the apex P5 having the maximum order is defined as the hub apex, the apexes P6, P10, P11, and the like indicated by black circles satisfy both requirements which are the range from the hub apex and the maximum order of the non-hub apex, are included in a hardware community, and the apex P12 does not satisfy the requirements because the order of the non-hub apex is 4. The number of the apex is set for descriptive convenience, and is not related to each of the apex IDs in FIG. 5. On the other hand, in case #6, the apex P5 is defined as the hub apex, in addition to the apexes P6, P10, and P11 indicated by black circles, the apexes P9, P12, and P13 are also included in the hardware community. In this case, the number of boundary sides 802 is the total number of sides connected to an apex community (to be referred to as a software community hereinafter) being outside the hardware community. Furthermore, a value obtained by dividing the total number of apexes 801 by the number of boundary sides is defined as a community ratio 804.

$$\text{Community ratio} = \frac{\text{(the total number of apex)}}{\text{(the number of boundary sides)}}$$

The community ratio which is high means a high density of loads of graph manipulation.

Referring to the community ratio 804 in FIG. 7, it is found that, of the community candidates 800, case #6 has 2.82, and case #2 has a maximum of 4.40. Furthermore, the total, number of apexes 801 and the total number of sides 803 are smaller than the acceptable values (the number of apexes: 50 and the number of sides: 100) of the resources, respectively. Thus, case #2 is assigned to a (first) hardware community. When the total number of apexes 801 and the total number of sides 803 are larger than the acceptable values of the resources, under the condition in which the numbers are equal to or smaller than the acceptable values, a candidate having the maximum community ratio 804 need only be assigned.

In this embodiment, the reason why hardware communities are formed around a hub apex is that the load of graph manipulation to the hub apex is generally heavy, and that high-speed processing can be achieved when the graph manipulation is performed with the hardware processing means. A reason why the number of boundary sides is employed to calculate the community ratio is that a communication volume between the communities can be reduced when the number of boundary sides is small and that high-speed processing can be achieved.

In processing S703, in order to determine whether the resources have margins, physical quantities of the hardware communities are subtracted from the acceptable values of the resources to calculate remaining resources. More specifically, in case #2 assigned as the (first) hardware community, the number of remaining apexes is 28 obtained by subtracting 22 from 50, and the number of sides is 76 obtained by subtracting 24 from 100. Furthermore, a margin ratio is determined for the remaining resources. In this operation, for example, 30% or more (the number of apexes is 15, and the number of sides is 30) of each of the number of remaining apexes and the number of remaining sides are set as a threshold value. When the condition is satisfied, it need only be determined that the resources have margins. Thus, in the above case, it is determined that the resources have margins.

Figure 8:
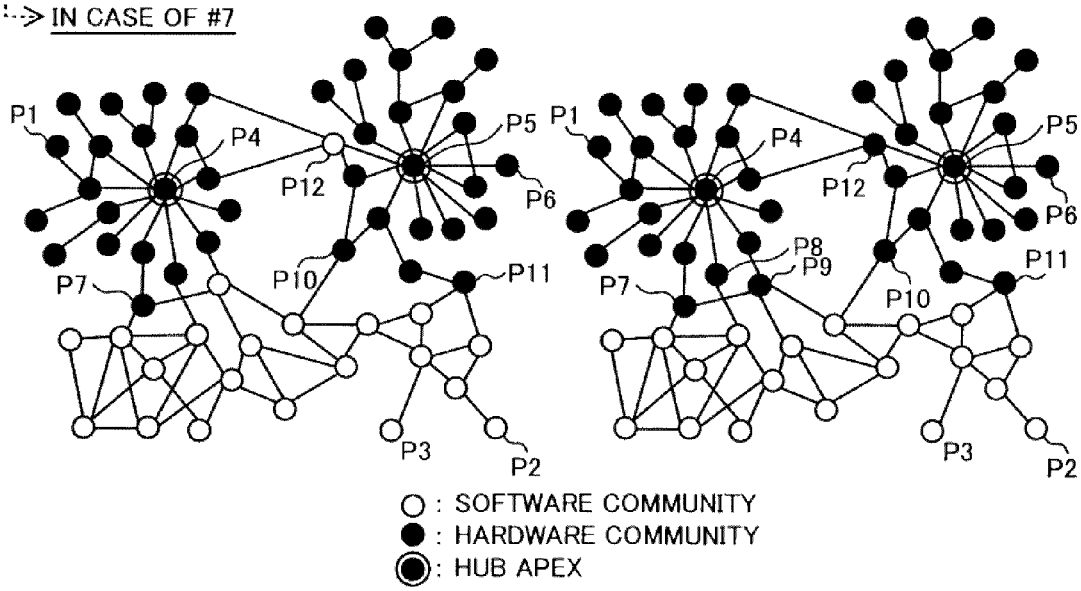
FIG. 8 is a diagram for explaining an operation of the load analysis means in the first embodiment.

It is determined in processing S703 that the resources have margins, the operation shifts to the operation in hub apex adding processing S704. In the hub apex adding processing S704, an apex having the second largest order in the above order list is added as the second hub apex. Returning to community selection processing S702, as shown in FIG. 8, with respect to a plurality of community candidates 900 obtained on the assumption that two (first and second) hub apexes are set, the total number of apexes 901, the number of boundary sides 902, the total number of sides 903, and a community ratio 904 are calculated again. In case #7, the apex P4 having the largest order is set as the (second) hub apex, the apexes P1, P7, P10, P11, and the like indicated by black circles are included in the hardware community, and the apex P12 does not satisfy the requirements of the hardware community because the maximum order of the non-hub apex is 4. On the other hand, in case #10, the apex P4 is set as the (second) hub apex, in addition to the apexes P1, P7, P10, P11, and the like, the apexes P9 and P12 are also included in the hardware community. As is apparent from FIG. 8, of the community candidates 900, case #10 is assigned to the (second) hardware community because the community ratio 904 of case #10 is a maximum of 6.14.

Furthermore, when the remaining resources are calculated to perform determination in processing S703, the number of apexes is 6 obtained by subtracting 44 from 50, and the number of sides is 49 obtained by subtracting 51 from 100. According to the result, the number of sides has a margin because the number of sides is 30 or more, and the number of apexes has no margin because the number of apexes is 15 or less. Thus, in the above case, the resources have no margins in processing S703. When it is determined that the resources have no margins, the operation of load analysis 401 is completed, and as a range of the graph manipulation to be executed by the hardware computation means 207, an apex ID corresponding to the conditions of case #10 having two hub apexes (P5 and P4) is output.

An operation of load distribution 402 will be described below.

The load distribution 402 is executed by the load distribution means 105, and the graph information 201 is divided into manipulations for hardware processing and software processing depending on the analysis result output from the load analysis 401. More specifically, the processing of a hardware community having a heavy load of graph manipulation, namely having two (first and second) hub apexes, shown in case #10, is defined as processing for hardware processing executed by the hardware processing means 111. With respect to the software processing, as shown in FIG. 9, apexes serving as boundaries between the hardware community and the software community serving as a target of the hardware processing, i.e., each of the apexes P7 to P11 indicated by black circles are defined as boundary apexes. The software community including the boundary apexes and having a light load of graph manipulation is defined as processing for software processing executed by the software computation means 110. On the basis of this idea, the graph information shown in FIG. 5 is divided.

From each of the boundary apexes P7 to P11 of the hardware processing, intermediate outputs which are results of the hardware processing are output to the corresponding boundary apexes P7 to P11 on the software processing side. On the software processing side, in response to those intermediate outputs, the software communities are processed. On the software processing side, a shortest path from the boundary apex to the hardware community side can be obtained only loading output information of the intermediate results. For example, in processing of shortest path searching between the apex P1 and the apex P2 in FIG. 9, the output information of the intermediate results from the apexes P7 to P11 and information pertaining to each of the apexes in the software community, for example, the apex P3 or the like serves as a target of software-computation. More specifically, the hardware processing calculates each of the paths between the apexes P3 and P7, P1 and P8, - - - , and P1 and P11, and the software processing calculates each of the paths between P7 and P2, P8 and P2, - - - , and P11 and P2. Thereafter, by the hardware processing, those paths are compared mutually to calculate the shortest path.

Next, operations of HDL conversion 403, logic synthesis 404, and a configuration 405 will be described below. The HDL conversion 403, on the basis of processing content information 202 and graph information for hardware processing, generates a hardware description language to mount a logic circuit on an FPGA. Several methods are conceived to achieve the operation. As an example of the methods, a method described in Non-patent literature 1 is given. According to Non-patent Literature 1, as a shortest path searching algorithm, a Bellman-Ford algorithm is applied, and a method of generating a Verilog code from the graph information is described. Next, the logic synthesis 404 generates a logic circuit at a gate level from the generated hardware description language. This operation can be achieved by using software such as Design Compiler available from Synopsys, Inc. A large part of the logic circuit generated from the Verilog code is constituted by an adder, a comparator, and a register. Furthermore, the configuration 405 is an operation to mount a logic circuit on an FPGA. This operation can be achieved by using a configuration device and software provided by, for example, the FPGA vender. The series of operations are executed by the HDL conversion means 204, the logic synthesis means 205, and the configuration means 206, respectively.

Next, an operation of logic (dedicated) computation (hardware computation) processing S406 will be described below. Logic (dedicated) computation processing S406 is to execute a heavy-load logic computation, and the processing is executed by the dedicated hardware computation means 207 to perform a computation depending on a mounted logical circuit. Since the processing content information 202 in the first embodiment is for the shortest path searching between all the apexes and the all the apexes, the hardware computation 406 outputs a list of shortest paths between all the apexes in the hardware community as a computation-result. The result is stored in the memory device 302 as intermediate result information 108.

Next, an operation of the software computation 408 will be described below.

Software-computation processing S408 is executed by the software computation means 110, and performs shortest path searching for all the apexes including the hardware community. The shortest path searching executed by software processing need only be executed by preparing programs for achieving existing algorithms such as, in addition to the Bellman-Ford algorithm, a Warshall-Floyd algorithm, or Dijkstra's algorithm.

A searching range may extend to both of the communities in shortest path searching for, for example, the apexes in the software community and the apexes in the hardware community. In this case, a shortest path between boundary apexes (between apexes P7 and P11 in FIG. 9) on the hardware community side can be obtained by only loading the intermediate result information 108.

According to the configuration and the operation of the information processing system of the first embodiment described above, the load analysis means and the load distribution means can extract an effective range for high-speed graph manipulation depend on the magnitude of the load of the graph manipulation to make it possible to cause the FPGA to perform the graph manipulation. For this reason, an increase in speed and a cost reduction of the entire graph manipulation can be compatibly achieved.

With the operation of software-computation processing S408 described above, the shortest paths between all the apexes in the graph shown in FIG. 4 can be calculated. A list of the shortest paths can be output as a computation-result. The result is stored in the memory device 302 as computation-result information 109.

In this manner, as the object of the present invention, a load of software processing can be reduced, and high-speed graph manipulation can be achieved.

The shortest path searching between all the apexes and all the apexes picked up in the first embodiment is a base of graph manipulation. By using the result of the shortest path searching, applied graph manipulation such as intermediation centricity or proximity centricity can be easily achieved.

In each of the embodiments of the present invention, the number of CPUs is not limited to one, and the processing may also be executed by a plurality of CPUs. In this case, a software community is desirably set such that a communication volume between the CPUs in software processing is minimized as much as possible. Furthermore, in selection of a community, the examples of changing ranges of the parameters are shown in FIG. 7. The changing ranges are not limited to those shown in FIG. 7, and the changing ranges may be more widened. In this case, the probability of finding a case having a higher community ratio increases. However, when the range is excessively widened, a long processing time is required. For this reason, the range is desired to be set in consideration of a balance between the accuracy and the processing time. Alternatively, the range may be designed to be able to be set by a user. Furthermore, the method of community selection processing S702 in FIG. 6 is not limited to the method described in the embodiment, and another algorithm can also be applied. Furthermore, also in calculation of the community ratio, an existing evaluation index such as modularity may be applied. Also in this case, the means may be desired to be selected in consideration of a balance between the accuracy and the processing time.

Second Embodiment

Next, an information processing system according to a second embodiment of the present invention will be described below. In terms of high-speed processing, it can be said that the hardware processing and the software processing in the first embodiment are desirably performed independently as much as possible. FIG. 10 is a flow chart for explaining an operation of the information processing system according to the second embodiment of the present invention. The second embodiment is different from the first embodiment in that partial processing of the software-computation processing, i.e., software-computation (primary) processing S407 is executed in parallel with hardware processings S403 to S406 and that, in response to the result from processing S406 and processing S407, software-computation (secondary) processing S408 may be executed. This operation can be achieved such that shortest path searching processing between the apexes in, for example, the software community is preferentially executed, and if the searching range extends to the hardware community, the searching processing is performed after the shortest path searching processing in the software community is performed. For example, while hardware processing between the apexes P1 and P7, P1 and P8, - - - , and P1 and P11, the shortest path searching processing between the apexes in the software community by the software processing, e.g., the shortest path searching processing between the apex P3 and the apex P2 can be executed without waiting the intermediate result information of the hardware community. Finally, with software-computation processing S408, the shortest paths between all the apexes in the graph can be calculated, and a list of the shortest paths is output as a computation-result. The result is stored in the memory device 302 as the computation-result information 109.

In this manner, as the object of the present invention, the load of the software processing can be reduced, and a high-speed graph manipulation can be achieved.

Third Embodiment

In a third embodiment of the present invention, an example of an information system obtained when the contents of graph manipulation is changed from the shortest path searching to pagerank analysis will be described below.

In the third embodiment, the basic configuration and the basic operation are the same as those in the information processing systems described in the first and second embodiments. The third embodiment is different from the first and second embodiments in that the processing content information 202 is pagerank analysis, and further, in that the processing contents of HDL conversion processing S403, hardware-computation processing S406, and software-computation processing S408 and the contents of the intermediate result information 108 and the computation-result information 109. An operation of the information processing system according to the third embodiment will be described below with a focus on the different points.

First, in HDL conversion processing S403, on the basis of the processing content information 202 and graph information for hardware processing, a Verilog code which achieves an algorithm of pagerank analysis is generated. In this case, the pagerank analysis is generally defined by the following equation (1), and all the coefficients can be calculated from the graph information shown in FIG. 5.

[Numerical Expression 1]

$$PR(Pi) = \frac{1-d}{N} + d \sum_{pj \subset M(pi)} \frac{PR(pj)}{L(pj)} \quad (1)$$

PR( ): pagerank value
pi: apex to be calculated
pj: apex having pi at a destination
L( ): output order
N: the number of apexes of target graph
d: adjustment coefficient (normally 0.85)

More specifically, HDL conversion processing S403 need only generate a Verilog code which achieves the Equation (1) from the graph information. A program for achieving the operation need only be prepared and executed. A large part of a logic circuit generated from the Verilog code is configured by a combination of an adder, a divider, and a register.

Figure 11:
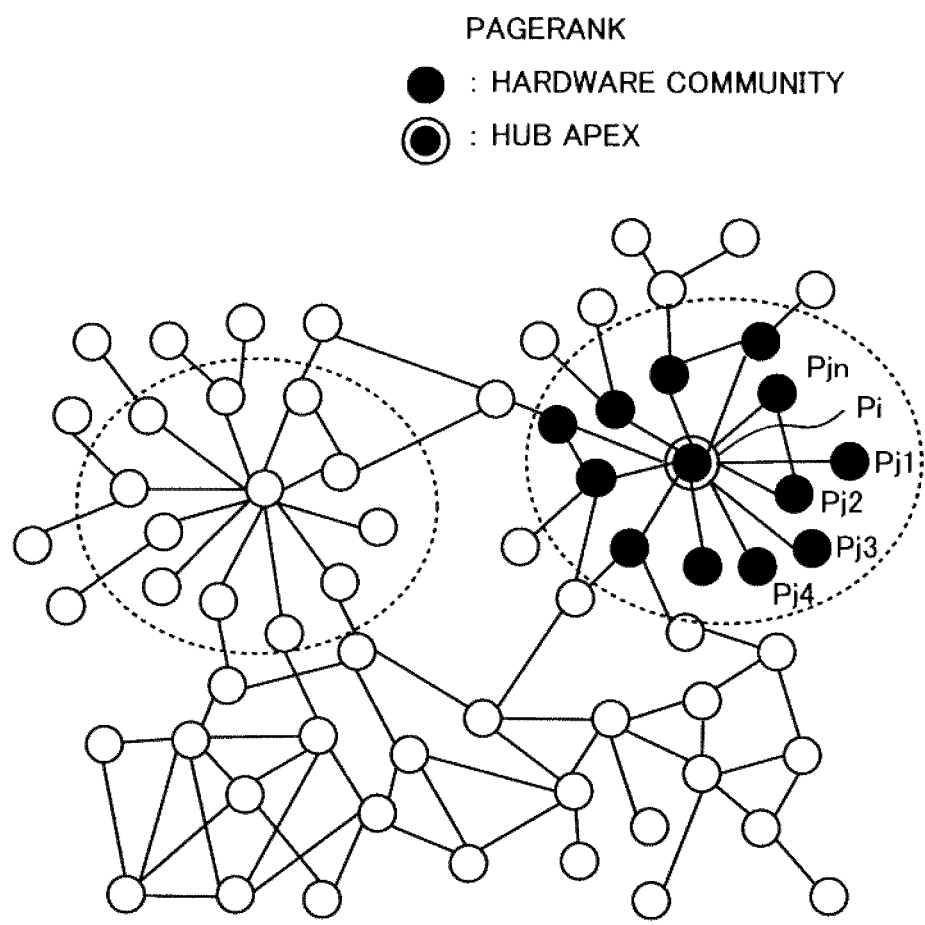
FIG. 11 is a diagram for explaining an image of pagerank processing according to a third embodiment of the present invention.

FIG. 11 is a diagram for explaining an image of pagerank processing according to the third embodiment. Reference symbol Pi denotes an apex to be calculated, and Pj (or Pjn) denotes an apex having the apex Pi at a destination.

In hardware-computation processing S406, since the processing content information 202 in the third embodiment is pagerank analysis, as in the first embodiment, a list of pagerank values PR( ) of all the apexes in a hardware community is output as a computation-result. The result is stored as the intermediate result information 108.

In software-computation processing S408, pagerank analysis is performed to all the apexes including the apexes in the hardware community. Pagerank analysis performed by software processing may also be executed by preparing a program for executing Equation (1). In this case, for example, in order to calculate the pagerank values PR( ) of the apexes in, for example, the software community, when the pagerank values of the apexes in the hardware community may be desired to be known, the analysis range may extend to both the communities. In this case, the pagerank values on the hardware community side can be obtained by only loading the intermediate result information 108. In this manner, as an object of the present invention, the load of the software processing can be reduced, and high-speed graph manipulation can be achieved. As in the first and second embodiments, when the hardware processing and the software processing are executed independently as much as possible, it is said that a desired result is obtained in an increase in speed of processing. This operation can be achieved such that, for example, apexes in which the pagerank values are calculated between the apexes in the software community are preferentially processed, and, if an analysis result extends to the hardware community, the analysis is performed after the apexes are processed in the software community. With the operation of software-computation processing S408 described above, pagerank values of all the apexes in the graph shown in FIG. 4 can be calculated, and a list of the pagerank values is output as a computation-result. This result is stored as the computation-result information 109.

According to the configuration and the operation of the information processing system of the third embodiment described above, a range effective for high-speed graph manipulation can be extracted and processed by an FPGA. In this manner, an increase in speed and a cost reduction of the entire graph manipulation can be compatibly achieved.

Fourth Embodiment

It cannot be argued that the graph and the FPGA picked up in the first to third embodiment of the present invention are at a large-scale level. This description is expediential, and, on the basis of the same idea as described above, the present invention can cope with a large-scale graph or a large-scale FPGA. In the embodiments according to the present invention, the description is made on the assumption that one FPGA is used. However, the number of FPGAs is not limited to one, and the processing can also be performed with a plurality of FPGAs.

Figure 12:
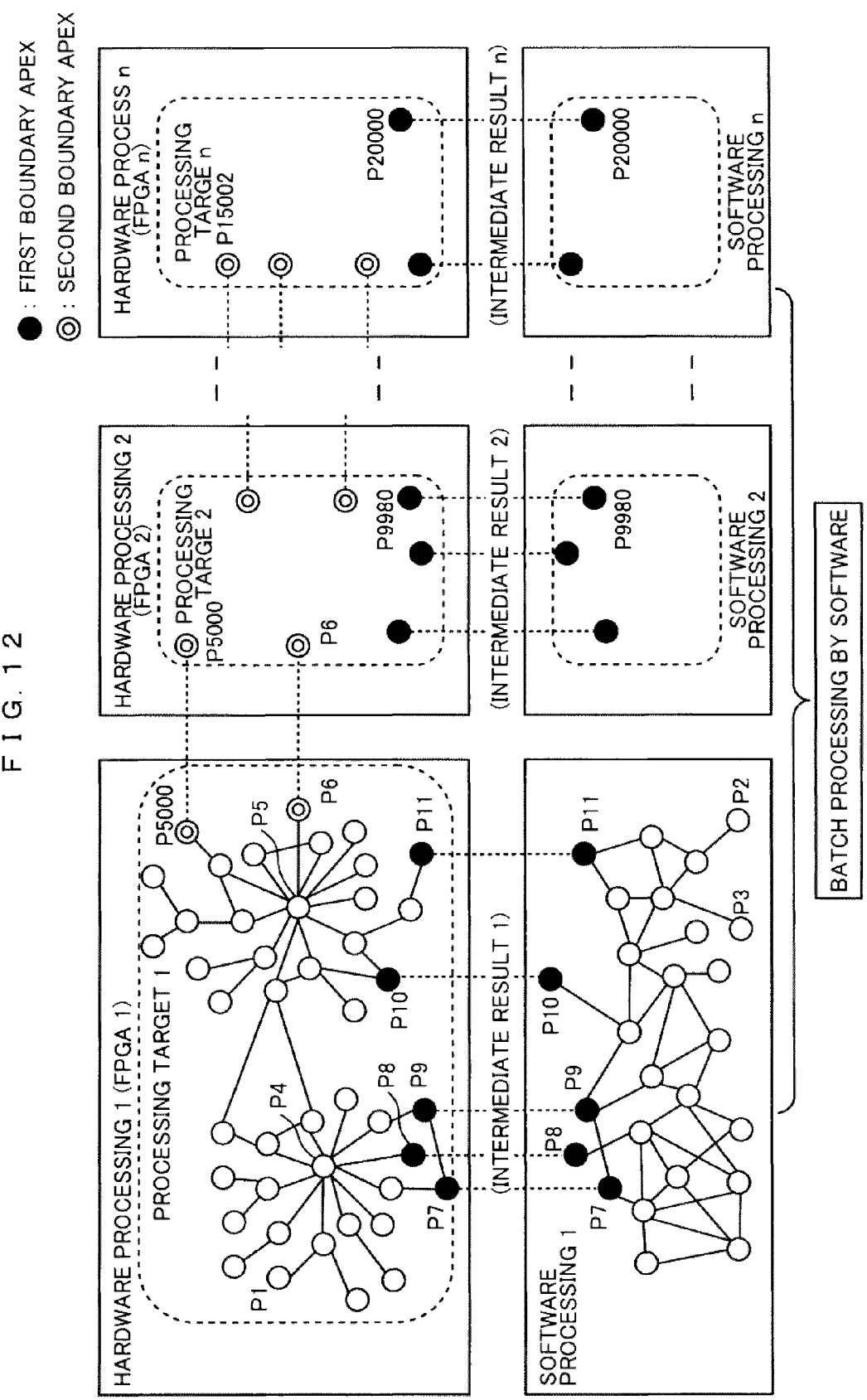
FIG. 12 is a block diagram for explaining of a function of an information processing system using a plurality of FPGAs according to a fourth embodiment of the present invention.

FIG. 12 is a block diagram for explaining functions of an information processing system using a plurality of FPGAs and a plurality of software computation means according to a fourth embodiment of the present invention. For example, it is assumed that the graph information 201 as shown in FIG. 5 has apexes having IDs=1 to 20000 and includes n FPGAs (FPGA1 to FPGAn) as hardware computation means and n software computation means. By the load analysis means and the load distribution means, first, in the graph information 201, for example, a processing region is divided into a plurality of regions depending on an entire load as indicated by, for example, apex IDs=1 to 5000, . . . , and, with respect to each of the regions, as described in the first to third embodiments, distribution processing is performed by the n FPGAs and the software computation means, and butch processing of output results from the FPGAs and the software computation means is further performed. In this case, a first boundary apex is distributed by the corresponding FPGA and the corresponding software computation means, and a second boundary apex is distributed by the adjacent FPGAs. The second boundary apex is an object to be processed by both the FPGAs which distributes the second boundary apex. For example, the apex 5000 of the FPGA 1 and the apex 5000 of the FPGA 2 are set as the second boundary apexes. At this time, a hardware community is desirably set such that a communication volume between the FPGAs is minimized as much as possible.

Also in this case, the load analysis means and the load distribution means repeats processing for generating a hardware community by using an apex having the largest order as a hub apex, regions having heavy load of graph manipulation are extracted as the hardware community and processed by the FPGA at a high speed, and regions having light loads of graph manipulation are processed by generalpurpose software to make it possible to compatibly achieve high-speed graph manipulation and a low cost.

In this manner, the plurality of regions are configured to mutually distribute the first boundary apex and the second boundary apex, so as to easily cope with a large-scale graph or a large-scale FPGA. For example, even though a large-scale graph including tens of millions of apexes is required to be processed, by a combination of processing by a plurality of FPGAs and processing by a plurality of pieces of software, an increase in speed of entire graph manipulation and a low cost can be compatibly achieved.

Fifth Embodiment

Furthermore, the embodiments of the present invention have picked up and explained graph manipulation. However, the embodiments of the present invention are applicable to not only the graph manipulation but also other processing such as image processing.

For example, a medical image photographed in radiotherapeutics, endoscopy, and thermography is subjected to other correction processing such as emphasis to make it possible to accurately extract an image of an affected area or the like depending on applications such as a diagnosis of disease, an examination, and an investigation, and is used to improve the accuracy of the diagnosis, a treatment, a surgical operation, or the like. Such medical image data, for example, like the graph information shown in FIG. 5, is expressed as data having enormous numbers of apexes obtained by horizontally and vertically arranging pixels each of which is expressed by 1 to 3 bytes in the form of a grating. In this case, processing contents include correction processing of the colors of the pixels. By the method as that in the third embodiment, depending on changes of the colors of regions of an image, i.e., the magnitudes of change rates of data between the apexes in the image, correction processing are distributed by hardware-computation processing and software-computation processing. For this reason, first, the densities of data to be processed, i.e., the magnitudes of loads of image processing are determined. A region having a large change rate of colors, i.e., a high density is processed as a hardware community by hardware-computation processing, and a region having a low density is processed as a software community by software-computation processing. In this manner, an increase in speed and a low cost of data processing of a medical image can be compatibly achieved.

In this manner, in all cases in which an increase in cost is so large when processing is performed with only FPGAs that an image processing system is difficult to be practically used, the leading motive of the present invention, i.e., "a range processed by an FPGA is determined depending on an object to be processed" can be applied.

Sixth Embodiment

In the software processing and the hardware processing described in the embodiments of the present invention, a time required for each processing can be estimated on the basis of the graph information output by load distribution processing S402, the processing content information 202, and the like. Thus, a configuration in which estimation information is input to community selection processing S702 and used as information for decision making when a hardware community is set may be considered. In this case, processing times in the hardware processing and the software processing can be balanced, and a further increase in speed of graph manipulation can be achieved.

REFERENCE SIGNS LIST

101 . . . optimal-load arrangement means,
102 . . . load-computation execution means,
103 . . . program information,
104 . . . load analysis means,
105 . . . load distribution means,
106 . . . software-computation information,
107 . . . hardware-computation information,
108 . . . intermediate result information,
109 . . . computation-result information,
110 . . . software computation means,
111 . . . hardware computation means,
201 . . . graph information,
202 . . . processing content means,
203 . . . resource information
204 . . . HDL conversion means,
205 . . . logic synthesis means,
206 . . . configuration means,
207 . . . hardware computation means,
301 . . . CPU,
302 . . . memory device,
303 . . . FPGA device,
304 to 306 . . . communication interface,
S401 . . . load analyzing processing,
S402 . . . load distribution processing,
S403 . . . HDL conversion processing,
S404 . . . logic synthesis processing,
S405 . . . configuration processing,
S406 . . . hardware-computation processing,
S408 . . . software-computation processing,
S701 . . . hub apex searching processing,
S702 . . . community selection processing,
S703 . . . processing for determining whether resources have margins,
S704 . . . hub apex adding processing,
800, 900 . . . candidate of hardware community,
801, 901 . . . the total number of apexes,
802, 902 . . . the number of boundary sides,
803, 903 . . . the total number of sides, and
804, 904 . . . community ratio.

The invention claimed is:

1. An information processing system comprising:
an optimal-load arrangement means; and
a load-computation execution means, wherein
the optimal-load arrangement means has a load analysis means, a load distribution means, and program information,
the load-computation execution means has a hardware processing means and a software computation means,
wherein the program information includes data to be processed, information pertaining to processing contents, and information pertaining to resources,
wherein the load analysis means has a community selecting function of assigning, in the data to be processed, data in regions having heavy loads and communication volumes between communities that can be reduced to a hardware community and assigning data in other regions to a software community, and
wherein the load distribution means distributes the data to be processed such that the assigned data of the hardware community is processed by the hardware processing means and the assigned data of the software community is processed by the software computation means,
wherein the hardware processing means includes a field-programmable gate array (FPGA) device,
wherein apexes serving as a boundaries between the hardware community serving as a target of hardware processing and the software community serving as a target of software processing are boundary apexes, and processing for apexes including the boundary apexes is performed in the hardware processing and the software processing, respectively, wherein the hardware processing means includes a plurality of FPGA devices, a plurality of software computation means are disposed corresponding to the FPGA devices, respectively, the boundary apexes serving as boundaries between the hardware communities and the software communities are defined as first boundary apexes, an apex serving as a boundary between the adjacent FPGA devices is defined as a second boundary apex, in each of the FPGA devices and a corresponding software computation means, processing for apexes including the first boundary apex is performed, and in each of the FPGA devices, processing for apexes including the second boundary apex is performed.

2. The information processing system according to claim 1, wherein the data to be processed is graph information constituted by apexes and sides and including connection relationships between the apexes, the load analysis means extracts, as a hub apex, an apex in which a sum of an input order and an output order is a maximum among the apexes of the graph information, and a range of the data to be processed which is to be processed by the FPGA device includes the hub apex.

3. The information processing system according to claim 2, wherein the load analysis means defines the apex having a maximum order as the hub apex and selects the hardware communities from apex groups formed around the hub apex in descending order of community ratios representing magnitudes of densities of loads.

4. The information processing system according to claim 3, wherein the hardware community is generated by using a number of paths from the hub apex and a maximum order of non-hub apexes as parameters.

5. The information processing system according to claim 4, wherein the community ratio is expressed by a value obtained by dividing the total number of apexes of the hardware community by a number of boundary sides, the number of boundary sides being a total number of sides connected to the software community from the hardware community.

6. The information processing system according to claim 1, wherein the load analysis means includes a hub apex searching function, a community analyzing function, and a hub apex adding function, the hub apex searching function extracts, as a hub apex, an apex in which a sum of an input order and an output order is a maximum among the apexes of the graph information, the community analyzing function defines an apex having a maximum order as a hub apex and selects the hardware communities from apex groups formed around the hub apex in descending order of community ratios representing magnitudes of densities of loads, and the hub apex adding function adds, when remaining resources have margins after the hub apex is extracted as a first hub apex, a new hub apex which satisfies requirements of the hub apex as a second hub apex.

7. The information processing system according to claim 1, wherein the processing contents are shortest path searching between apexes or pagerank analysis of calculating pagerank values of apexes.

8. An information processing system comprising:

a CPU, a memory device, a software computation means, a field-programmable gate array (FPGA) device, and a communication means, wherein the memory device have data to be processed, information pertaining to processing contents, and information pertaining to resources, wherein the information processing system includes a community selecting function of assigning, in the data to be processed, data in regions having heavy loads and reducible communication volumes to a hardware community and assigning data in other regions to a software community, and a function of distributing the data to be processed such that the assigned data of the hardware community is processed by the FPGA device and the assigned data of the software community is processed by the software computation means, wherein apexes serving as a boundaries between the hardware community serving as a target of hardware processing and the software community serving as a target of software processing are boundary apexes, and processing for apexes including the boundary apexes is performed in the hardware processing and the software processing, respectively, wherein the FPGA device includes a plurality of FPGA devices, the software computation means includes a plurality of software computation means disposed corresponding to the FPGA devices, respectively, the boundary apexes serving as boundaries between the hardware communities and the software communities are defined as first boundary apexes, an apex serving as a boundary between the adjacent FPGA devices is defined as a second boundary apex, in each of the FPGA devices and a corresponding software computation means, processing for apexes including the first boundary apex is performed, and in each of the FPGA devices, processing for apexes including the second boundary apex is performed.

9. The information processing system according to claim 8, wherein the data to be processed is graph information constituted by apexes and sides and including connection relationship between the apexes, the load analysis means extracts an apex in which a sum of an input order and an output order is a maximum among the apexes of the graph information as a hub apex, and a range of the data to be processed which is to be processed by the FPGA device includes the hub apex.

10. The information processing system according to claim 9, wherein the range of the data to be processed which is to be processed by the FPGA device is a range in which a community ratio representing a magnitude of a density of loads is maximum in apex groups formed around the hub apex.

11. A data processing method in an information processing system using a field-programmable gate array (FPGA), wherein the information processing system includes a CPU, a memory device, a software computation means, an FPGA device, and a communication means, the memory device has data to be processed, information pertaining to processing contents, and information pertaining to resources, the data processing method comprising steps of:

in the data to be processed, assigning data in regions having heavy loads and reducible communication volumes to a hardware community, and assigning data in other regions to a software community, and distributing the data to be processed such that the assigned data of the hardware community is processed by the FPGA device and the assigned data of the software community is processed by the software computation means, wherein apexes serving as a boundaries between the hardware community serving as a target of hardware processing and the software community serving as a target of software processing are boundary apexes, and processing for apexes including the boundary apexes is performed in the hardware processing and the software processing, respectively, wherein the FPGA device includes a plurality of FPGA devices, a plurality of software computation means are disposed corresponding to the FPGA devices, respectively, the boundary apexes serving as boundaries between the hardware communities and the software communities are defined as first boundary apexes, an apex serving as a boundary between the adjacent FPGA devices is defined as a second boundary apex, in each of the FPGA devices and a corresponding software computation means, processing for apexes including the first boundary apex is performed, and in each of the FPGA devices, processing for apexes including the second boundary apex is performed.

12. The data processing method in an information processing system according to claim 11, wherein the data to be processed is graph information constituted by apexes and sides and including connection relationships between the apexes, the data processing method further comprising steps of:

extracting an apex in which a sum of an input order and an output order is a maximum among the apexes of the graph information as a hub apex, and processing a range of the data to be processed including the hub apex and having a maximum community ratio by the FPGA device.

* * * * *